(12) United States Patent
Wilson et al.

(10) Patent No.: US 8,978,857 B2
(45) Date of Patent: Mar. 17, 2015

(54) FRICTION CLUTCH SYSTEM

(75) Inventors: Patrick R. Wilson, Dewey, AZ (US); Kevin C. Payne, Prescott Valley, AZ (US); William F. Baty, Prescott Valley, AZ (US)

(73) Assignee: TNMJ Caliber, LLC, Prescott, AZ (US)

( * ) Notice: Subject to any disclaimer, the term of this patent is extended or adjusted under 35 U.S.C. 154(b) by 810 days.

(21) Appl. No.: 13/028,965

(22) Filed: Feb. 16, 2011

(65) Prior Publication Data

US 2011/0132714 A1 Jun. 9, 2011

Related U.S. Application Data

(63) Continuation-in-part of application No. 12/813,273, filed on Jun. 10, 2010, now Pat. No. 8,430,222.

(60) Provisional application No. 61/257,341, filed on Nov. 2, 2009.

(51) Int. Cl.
*F16D 13/68* (2006.01)
*F16D 13/38* (2006.01)
*F16D 13/70* (2006.01)

(52) U.S. Cl.
CPC ........ *F16D 13/385* (2013.01); *F16D 2013/706* (2013.01)
USPC ........................................ 192/70.17; 29/428

(58) Field of Classification Search
USPC .................. 192/30 V, 70.17, 70.19, 200, 201, 192/70.252, 111.16; 29/428, 469; 464/27, 464/37, 160, 161
See application file for complete search history.

(56) References Cited

U.S. PATENT DOCUMENTS

| | | | | | |
|---|---|---|---|---|---|
| 2,259,461 | A * | 10/1941 | Eason | ..................... | 192/70.17 X |
| 3,561,577 | A * | 2/1971 | Binder | | |
| 3,642,101 | A * | 2/1972 | Hauth | ..................... | 192/70.17 X |
| 4,257,502 | A * | 3/1981 | Riese | ....................... | 192/70.252 |
| 4,640,399 | A * | 2/1987 | Borjesson | ................ | 192/70.252 |
| 4,715,484 | A * | 12/1987 | Flotow | ..................... | 192/70.252 |
| 6,702,081 | B2 * | 3/2004 | Gorman et al. | | |
| 7,204,356 | B2 * | 4/2007 | Fox | ........................ | 192/70.19 X |
| 2009/0221376 | A1 * | 9/2009 | Movlazada | | |

OTHER PUBLICATIONS

"Couple." Merriam Webster. [online], [retrieved on Jan. 7, 2014]. Retrieved from the Internet <URL: http://www.merriam-webster.com/dictionary/couple>.*

* cited by examiner

*Primary Examiner* — Gregory Binda
*Assistant Examiner* — Josh Skroupa
(74) *Attorney, Agent, or Firm* — Lowe Graham Jones PLLC

(57) ABSTRACT

A friction clutch system mechanically couples a power source to a driven system of a vehicle to reduce the rotational inertia of the clutch system, provide torsional damping within the system, and minimize vibration (e.g., rattling) between a floater and a flywheel. In one embodiment, the friction clutch system includes a first friction disc assembly directly engaged with a second friction disc assembly. The first disc assembly may include protuberances that extend axially from a hub assembly, which in turn may include damping springs and an internal splined region for coupling to a splined, driven shaft. The second friction disc assembly includes openings, which may take the form of radial slots, configured to engageably receive the protuberances. The first disc assembly may be positioned adjacent to a pressure plate assembly or a flywheel. A floater plate may be located between the first and second friction disc assemblies.

6 Claims, 15 Drawing Sheets

FRICTION CLUTCH SYSTEM

PRIORITY CLAIM

This application is a continuation-in-part to U.S. patent application Ser. No. 12/813,273 (now U.S. Pat. No. 8,430,222) filed on Jun. 10, 2010, which claims the benefit of the filing date of U.S. Provisional Patent Application No. 61/257,341 filed on Nov. 2, 2009, both of which are incorporated by reference herein in their entireties.

FIELD OF THE INVENTION

This invention relates generally to a friction clutch system for mechanically coupling a power source to a driven system of a vehicle.

BACKGROUND OF THE INVENTION

As shown in FIG. 1, one conventional type of friction clutch system 10 may be found in an automobile for engaging, disengaging and transmitting torque from the engine 12 (i.e., power source) to a transmission 14 (i.e., driven system). By way of example, the conventional automotive friction clutch system 10 includes a thrust or pressure plate 16 mounted within a clutch housing 18 so that the thrust plate 16 cannot rotate within the housing 18, but can move axially within the clutch housing. The housing 18 is mounted to a counterthrust plate 20. Being weighted, the counterthrust plate is also commonly used as a flywheel as well. The flywheel 20 is mounted to and driven by the power source 12, which may take the form of an internal combustion engine, an electric motor, etc.

The pressure plate 16 may be biased or pressed toward the flywheel 20 by one or more partially compressed Belleville springs, (diaphragms), or coil springs (not shown) and may or may not also employ centrifugal clamping force assist (in the form of bob weights, not shown) all of which can be mounted within the housing 18. The assembled combination of the clutch housing 18, the pressure plate 16, and the diaphragm/spring is generally referred to as a pressure plate assembly 22 within the automotive industry.

A friction disc assembly 24 is located between the flywheel 20 and the pressure plate assembly 22. The friction disc assembly 24 includes, in the illustrated example, a floater disc 26 sandwiched between two friction discs 28. The friction discs 28 include friction facings or linings 30, a carrier plate 32 and a splined hub 34. The friction facings 30 bonded or otherwise, are mechanically connected to the carrier plate 32. The carrier plates 32 are coupled by the splined hub 34, which takes the form of an internally splined hub, to an externally splined shaft 36 of the driven member 14.

In FIG. 2, the like components retain the same reference numerals, but the friction clutch system 10 includes a different friction disc assembly 40. As illustrated, the friction disc assembly 40 includes a floater disc 42 sandwiched between two friction discs 44, both having multiple, radially located damper springs 46 for the purpose of smoothing clutch engagement and isolating engine vibrations from the transmission 14 and driveline (not shown). The damper springs 46 are positioned in a sprung hub assembly 48 that extends axially.

For greater torque capacity and improved heat dissipation, a friction clutch system may incorporate multiple friction discs mounted between the pressure plate assembly and the flywheel. For multi-plate clutch designs, the floater or floater plate may be mounted to and driven by the flywheel, with a floater being located between adjacent pair of friction discs. The pressure plate assembly, flywheel and floater also serve as friction surfaces for the friction discs. Because each friction disc assembly typically has two friction surfaces, a two disc clutch will have four friction surfaces, a three disc clutch will have six friction surfaces, and so on.

The torque capacity of a friction clutch system is defined as the maximum amount of torque that can be transferred through the system while in its fully engaged state. Once the clutch torque capacity has been exceeded, torque can be lost through the unintentional slipping effect caused between the friction surfaces of the friction clutch system components.

The conventional clutch system of FIG. 1 includes two solid hubs, each with internal splines for engaging the shaft of the transmission, but without any damper springs to reduce the spatial envelop and provide a low rotating weight. However, the lack of damper springs to smooth clutch engagement and isolate engine vibrations can, at least eventually, have a detrimental effect on driveline components. In addition, clutch performance and drive-ability of the vehicle may be diminished.

The conventional, multiple disc clutch system of FIG. 2 with the two sprung hub assemblies, both internally splined for engaging the shaft of the transmission may help with isolating engine vibrations, but require a greater spatial envelope and increase the rotating weight of the system. Current space constraints in various vehicles would not provide room for such an arrangement. Consequently, both conventional systems may be undesirable for use as a high-performance clutch system

SUMMARY OF THE INVENTION

A friction clutch system mechanically couples a power source to a driven system of a vehicle while reducing the rotational inertia of the clutch system and yet still providing torsional damping within the system. In one embodiment, the friction clutch system includes a first friction disc assembly directly engaged with a second friction disc assembly. The first disc assembly may include protuberances that extend axially from a hub assembly, which in turn may include damping springs and an internal splined region for coupling to a splined, driven shaft. The second friction disc assembly includes openings, which may take the form of radial slots, configured to engageably receive the protuberances. The first disc assembly may be positioned adjacent to a pressure plate assembly or a flywheel. A floater plate may be located between the first and second friction disc assemblies.

In one aspect of the invention, a friction clutch system includes a flywheel; a first friction disc assembly having a plurality of protuberances extending axially from a hub assembly; a second friction disc assembly having a plurality of openings configured to engageably receive the protuberances; a floater located between the first and second friction disc assemblies; and a pressure plate assembly operable to generate frictional contact forces between the flywheel and at least one of the friction disc assemblies.

In another aspect of the invention, a method for operating a friction clutch system includes actuating a pressure plate assembly to frictionally engage one of a first or a second friction disc assembly. The first friction disc assembly includes a plurality of protuberances extending axially from a hub assembly, and the second friction disc assembly includes a plurality of openings that engageably receive the protuberances. The method further includes producing frictional contact on a floater plate located between the friction disc assemblies. And lastly, the method includes producing frictional contact between a flywheel and one of the first or second friction disc assemblies. Driven by the power source, the flywheel, floater and pressure plate are operable to rotate the disc assemblies when the pressure plate assembly is engaged.

In yet another aspect of the invention, a method for assembling a friction clutch system, includes the steps of (1) positioning a floater plate between a first friction disc assembly and a second friction disc assembly; (2) positioning one of the disc assemblies adjacent to a pressure plate assembly; (3) positioning the other disc assembly adjacent to a flywheel; and (4) arranging the first friction disc assembly to directly engage with the second disc assembly, wherein directly engaging includes the first friction disc assembly having a plurality of protuberances extending axially from a hub assembly, and wherein the protuberances extend by an amount sufficient to directly engage a plurality of openings in the second friction disc assembly.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present invention generally relates, but is not limited, to friction clutch system for mechanically coupling a power source to a driven system of a vehicle. In at least one embodiment, the present invention combines a spring-damped, splined hub with one or more secondary friction discs. The hub includes axially extending protuberances that engage radial slots located in the secondary friction disc. Advantageously, the friction clutch system described herein may allow for torsional vibration damping while reducing the rotational mass of the system. Further, the friction clutch system may provide a more compact and simplified installation.

Figure 3A:
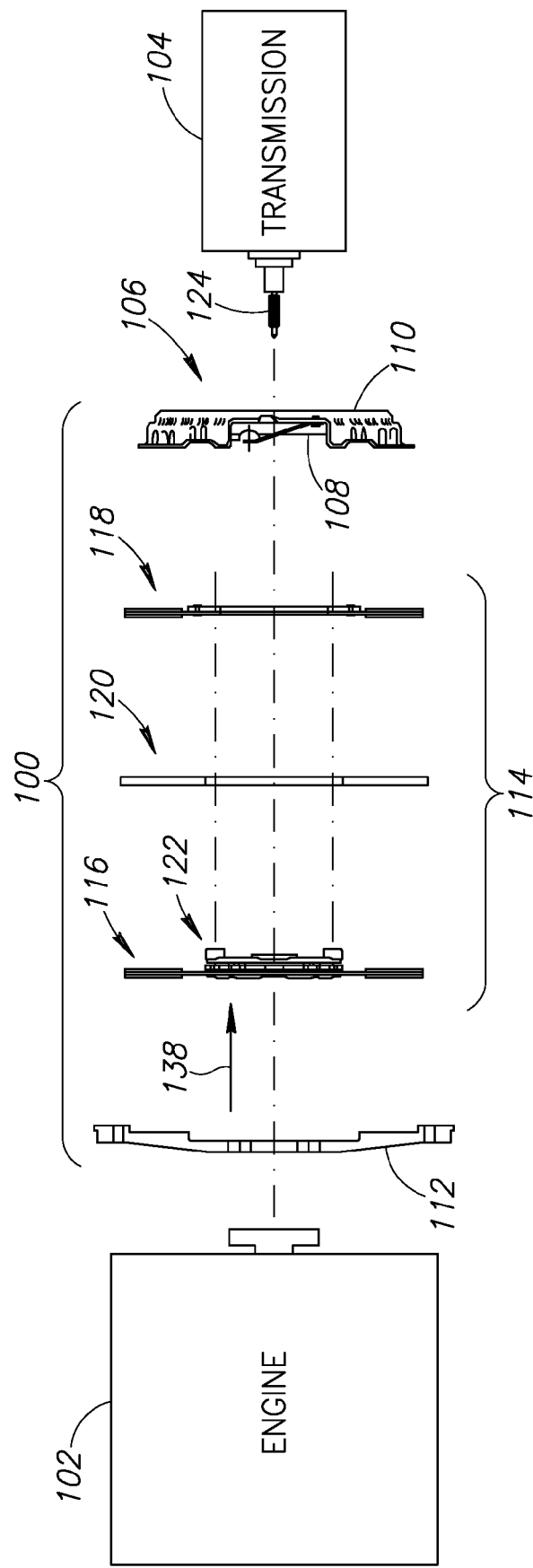
FIG. 3A is an exploded, schematic view of a friction clutch system having a first friction disc assembly with protuberances to directly engage a second friction disc assembly according to an embodiment of the present invention.

FIG. 3A shows an exploded, schematic view of a friction clutch system 100 for engaging, disengaging and transmitting torque from a power source 102 (e.g., engine) to a driven member 104 (e.g., transmission). Similar to the conventional friction clutch systems described above, the illustrated friction clutch system 100 includes a pressure plate assembly 106 comprising a pressure plate 108 mounted within a clutch housing 110, which in turn is mounted to a counterthrust plate or flywheel 112.

In the illustrated embodiment, the pressure plate assembly 106 includes a spring or springs that provide the primary engagement force to a friction disc assembly 114, which may include multiple (two or more) friction discs 116, 118 with a floater plate 120 located therebetween. The floater plate 120 may take the form of the floater plates previously described.

Figure 1:
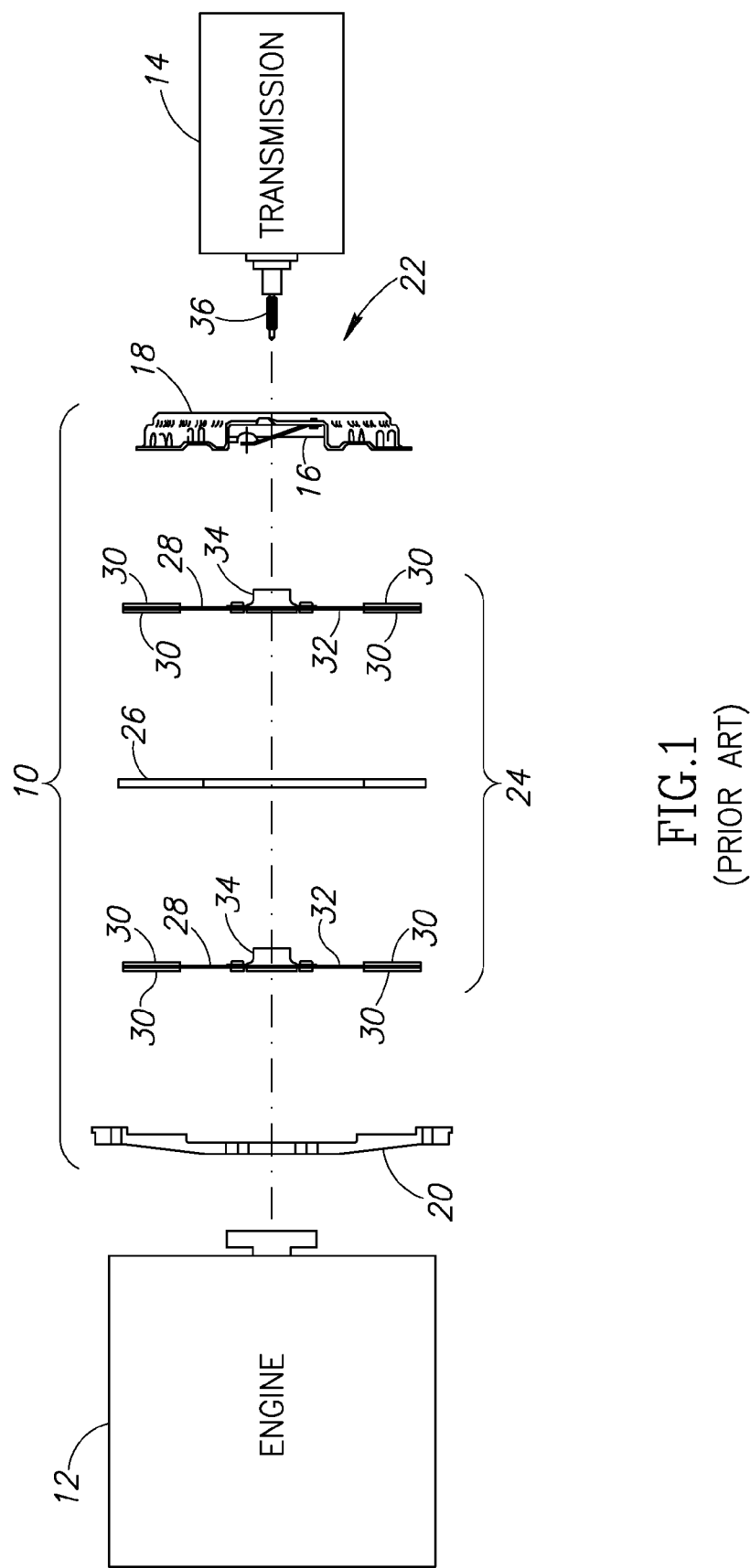
FIG. 1 is an exploded, schematic view of a prior-art friction clutch system having friction disc assemblies each with solid hubs coupled to a splined shaft of a driven member.
Figure 2:
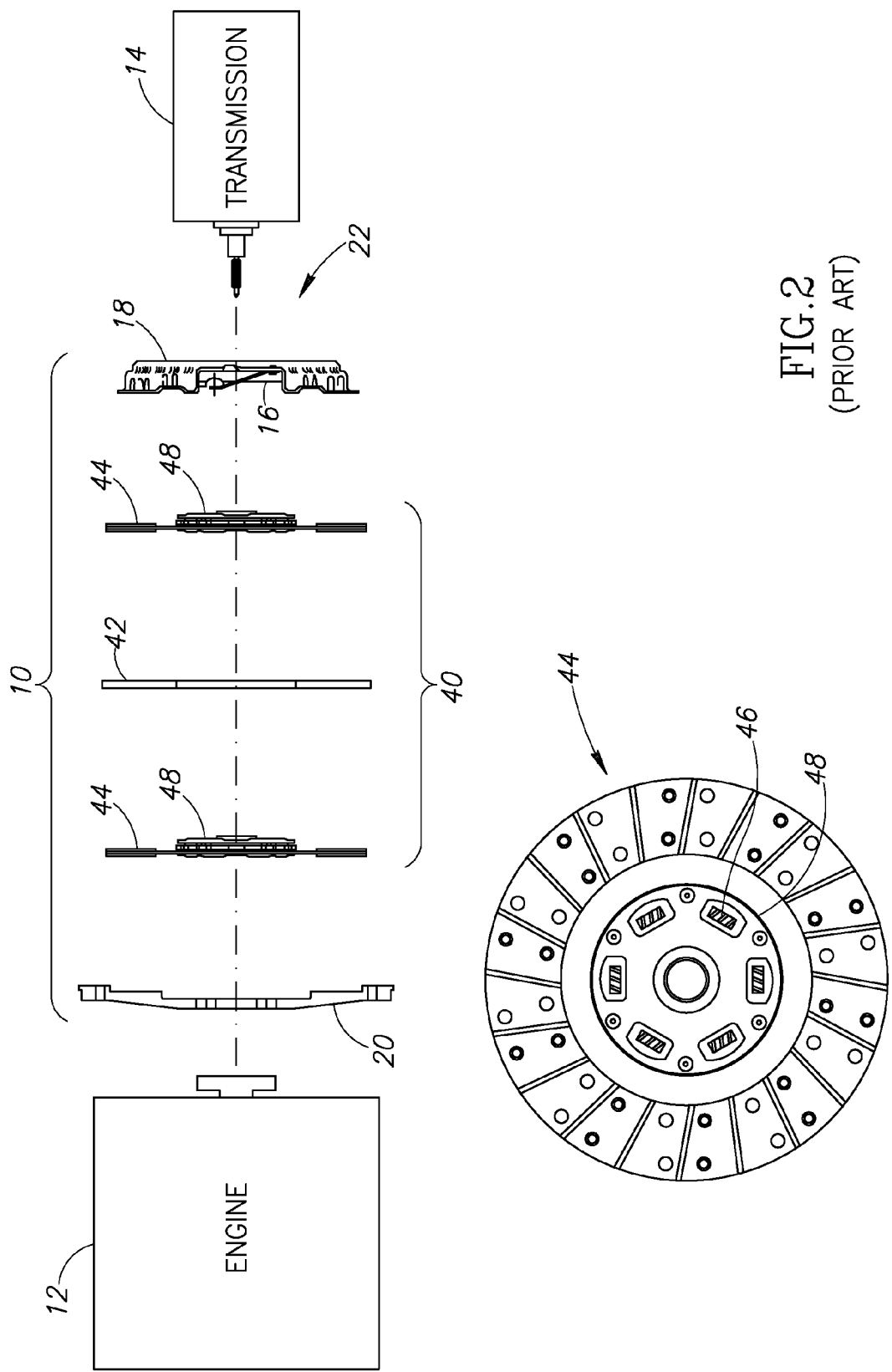
FIG. 2 is an exploded, schematic view of a prior-art friction clutch system having friction disc assemblies each with damping springs located in hubs coupled to a splined shaft of a driven member.

Of the two illustrated friction discs 116, 118, only first disc 116 includes a hub assembly 122 mounted to a driven shaft 124. The second disc 118 does not have a hub assembly (e.g., sprung hub) and is not mounted to the driven shaft 124, but instead engages the first disc 116 as will be described in detail below. Such a configuration may advantageously provide a lighter weight system having a lower rotational inertia while also being more spatially compact than previous systems in which each friction disc included its own hub assembly independently splined to the driven shaft. The space requirements are reduced due to having fewer sprung splined hub assemblies than friction discs. One of the drawbacks of the conventional assembly shown in FIG. 2 was that the amount of space required to have a sprung hub on each friction disc exceeded the allowable design spatial envelope between the pressure plate assembly and flywheel. Thus, to fit such an assembly the springs in the hub assembly would have to be made quite small, making them more difficult to install, harder to retain and less robust in view of the spring forces needed. Another possible advantage of the friction clutch system 100 is that it may replace stock clutch systems within the space envelope provided for the stock clutch system.

Figure 3B:
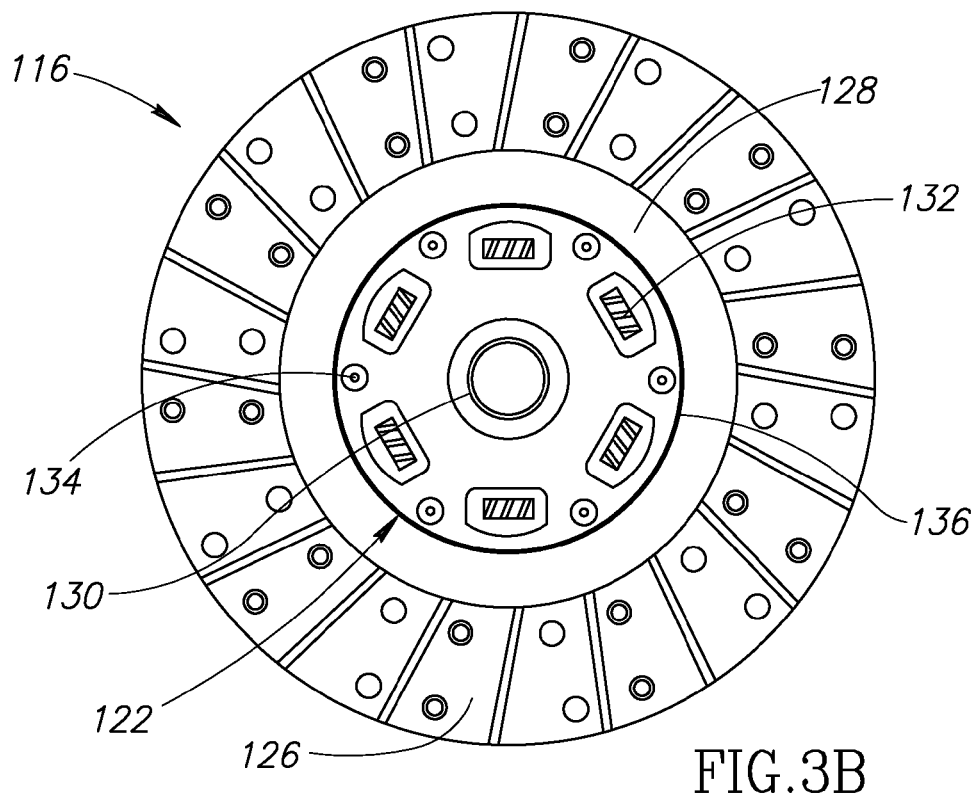
FIG. 3B is schematic, side elevational view of the first friction disc of FIG. 3A with protuberances according to an embodiment of the present invention.
Figure 3C:
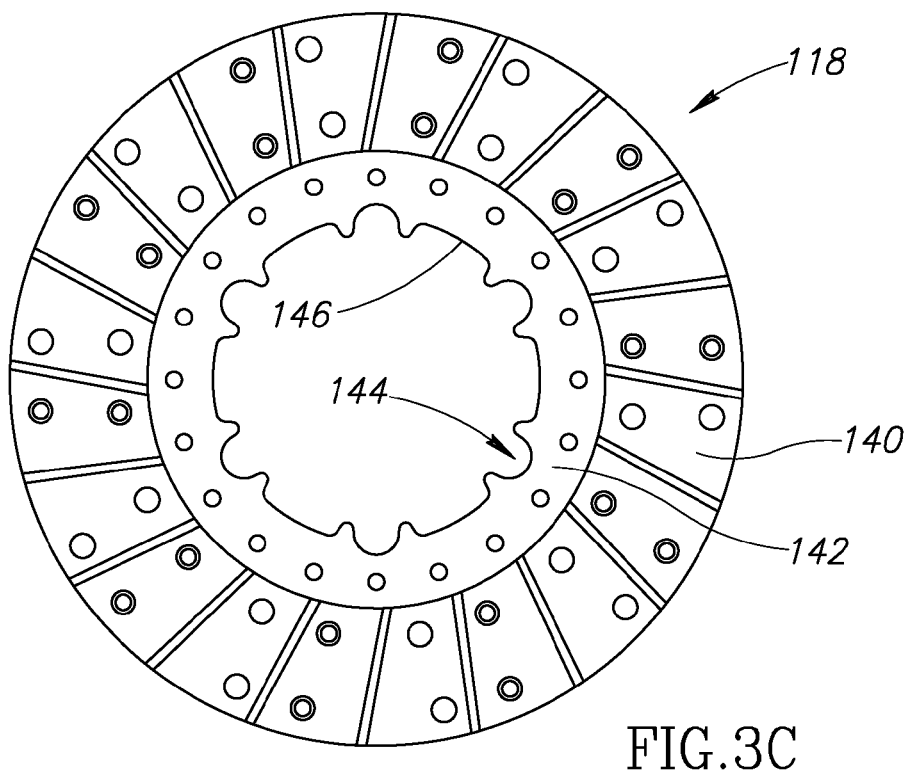
FIG. 3C is schematic, side elevational view of the second friction disc of FIG. 3A with openings according to an embodiment of the present invention.
Figure 4:
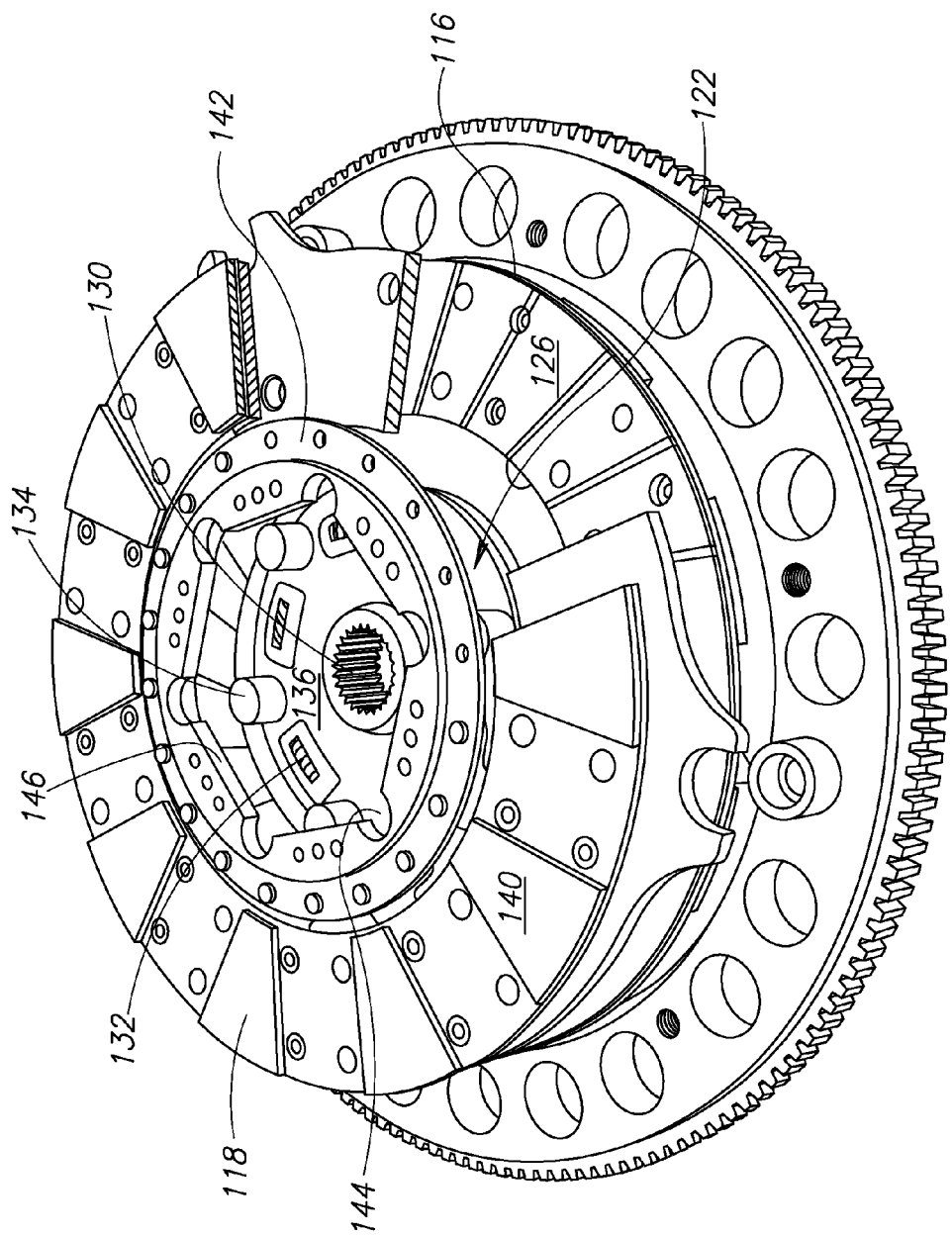
FIG. 4 is a perspective, exploded, partially cut-away view of a friction clutch system having a first friction disc assembly with protuberances to directly engage a second friction disc assembly according to an embodiment of the present invention.

Referring now to FIGS. 3 and 4, the first disc 116 includes the hub assembly 122 and friction facing and/or a plurality of friction pads 126 mounted circumferentially onto a disc body 128. The hub assembly 122 includes an internal splined portion 130, a plurality of damping springs 132, and a plurality of protuberances 134 extending from a hub assembly cover 136. The damping springs 132 may take the form of torsional damping springs. The protuberances 134 may take the form of pins or dowels, which may be cylindrical or have another type of cross-sectional shape. The protuberances 134 extend in an axial direction as indicated by arrow 138 (FIG. 3A).

The second disc 118 includes a friction facing and/or a plurality of friction pads 140 coupled to a central member 142. A plurality of openings 144 are machined or otherwise formed into the central member 142. The openings 144 may take the form of radial slots or notches extending from an inner edge 146 of the central member 142. In addition, the openings 144 are configured to receivably and directly engage the protuberances 134 of the first disc 116. This engagement prevents the discs 116, 118 from rotating relative to one another, but will permit independent axial movement of the secondary friction disc(s) within the given design range. As best seen in FIG. 4, the openings 144 preferably have a shape that complementarily corresponds to the cross-sectional shape of the protuberances 134. For example, if the protuberances 134 are cylindrical then the openings will be circular as well. Alternatively radial slots could receive protuberances of various configurations. Further the openings 144 are sized and aligned to accurately receive the protuberances 134.

Figure 5:
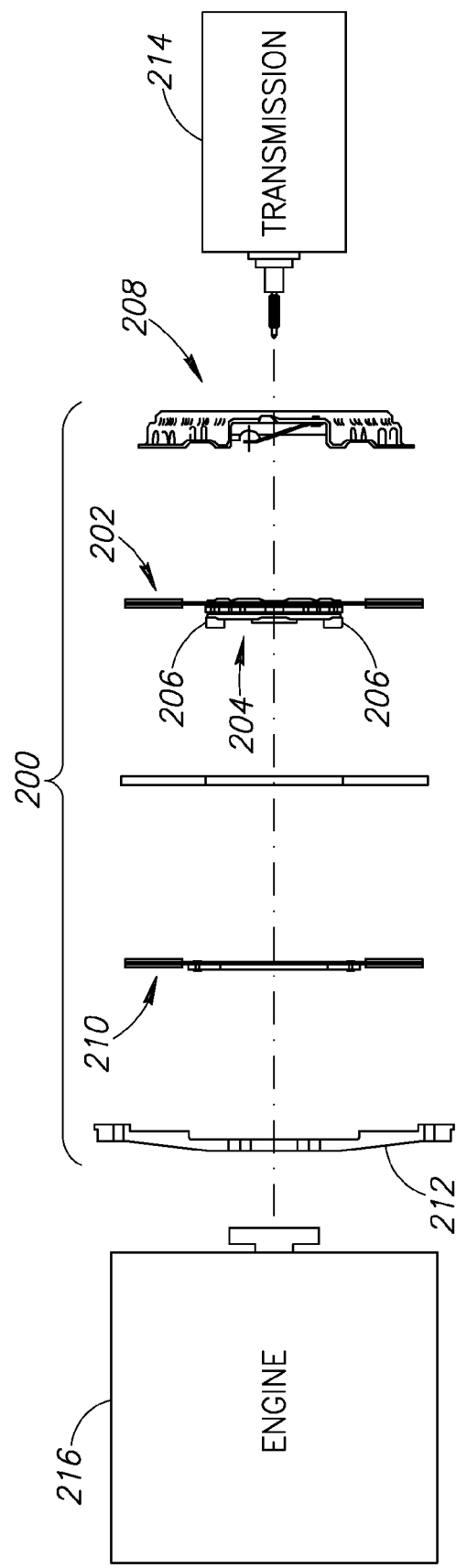
FIG. 5 is a an exploded, schematic view of a friction clutch system having a first friction disc assembly positioned adjacent to a driven member (e.g., pressure plate assembly) and a second friction disc assembly positioned adjacent to a power source (e.g., flywheel) according to another embodiment of the present invention.

FIG. 5 shows a friction clutch system 200 in which a first disc 202 with a hub assembly 204 and protuberances 206 is positioned adjacent to a pressure plate assembly 208. A second disc 210 with openings (not shown) to receive the protuberances 206 is positioned adjacent to a flywheel 212. In comparing FIG. 5 to FIG. 3, the locations of the first and second discs have been switched. Consequently, the first disc 202 may be on the driven side proximate the driven member 214 (e.g., transmission) while the second disc 210 may be on the driving or power side proximate the power source 216 (e.g., engine).

Figure 6A:
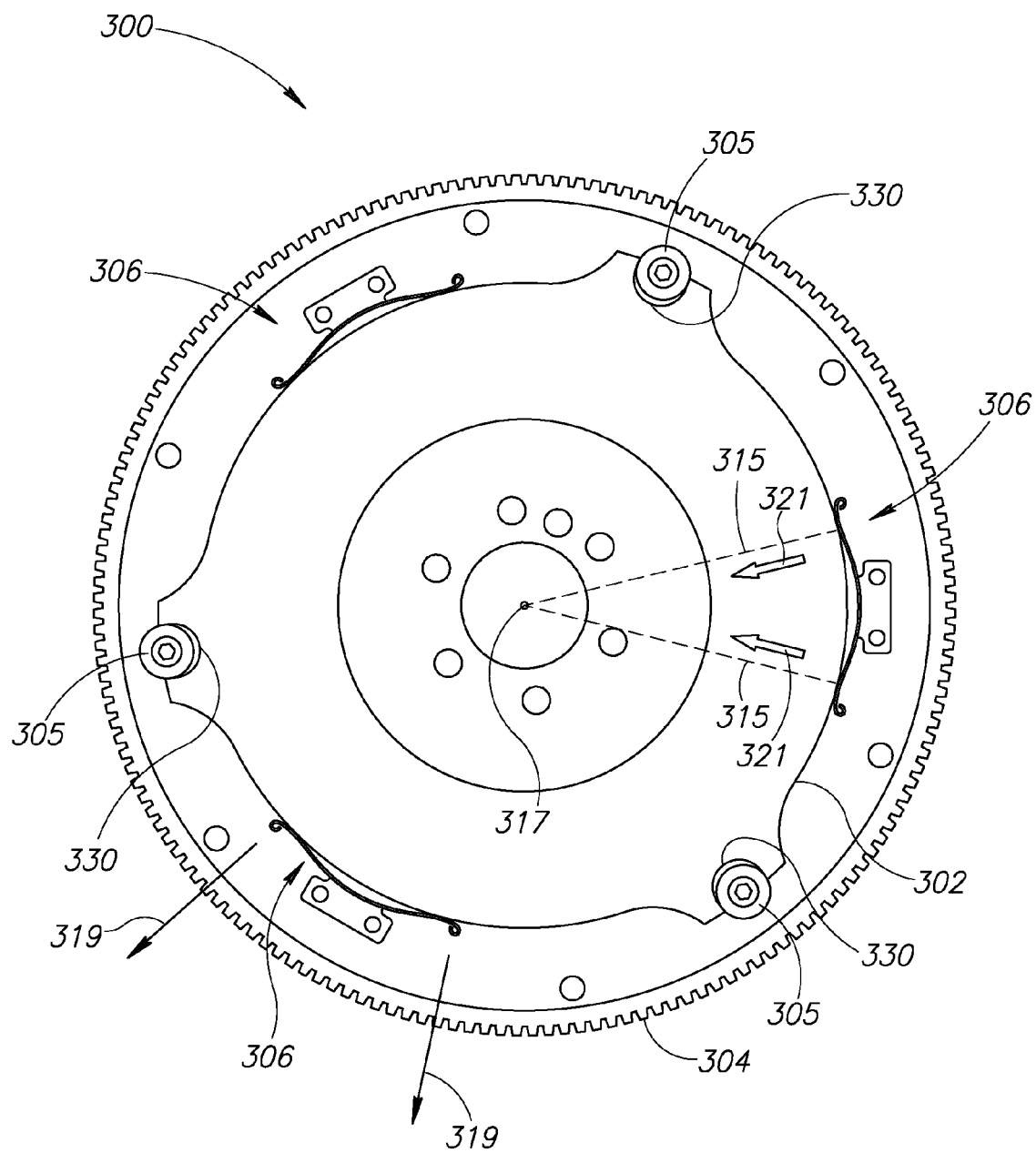
FIG. 6A is a top, plan view of a friction clutch system having a floater resiliently coupled to a flywheel with a plurality of resilient coupling assemblies according to an embodiment of the present invention.
Figure 6B:
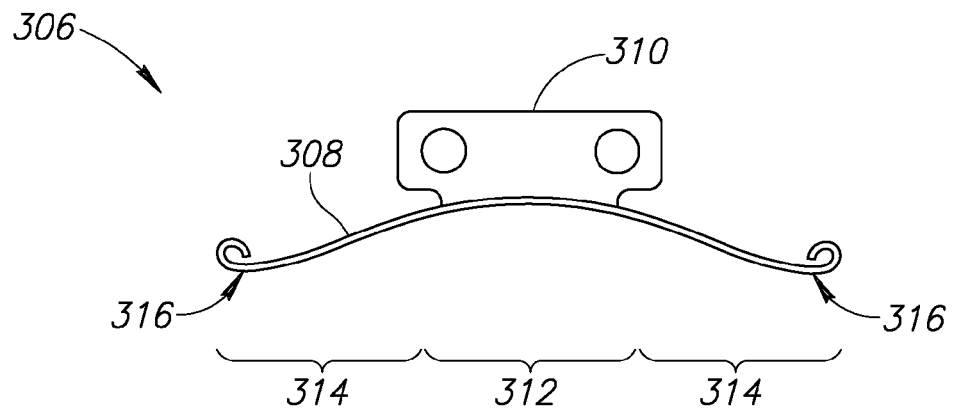
FIG. 6B is a top, plan view of one of the resilient a spring portion and clip portion from one of the resilient coupling assemblies of FIG. 6A.

FIGS. 6A and 6B show a friction clutch system 300 with a floater 302 resiliently coupled to a flywheel 304 by means of drive pins 305 or lugs attached to the flywheel 304. This engagement between the flywheel 304 and the floater 302 prevents independent rotation relative to one another, but will allow independent axial movement of the floater plate 302 relative to the flywheel 304 In the illustrated embodiment, the resilient coupling is achieved with a resilient coupling assembly 306, which as best shown in FIG. 6B takes the form of a leaf spring 308 fixed to a clip 310. The leaf spring 308 may include a central arcuate portion 312 fixed to the clip 310. Symmetric arms 314 extend respectively from the central arcuate portion 312. Both arms 314 include a contact surface 316 for contacting the floater 302 along a radial line of action 315 relative to a center point 317 of the floater 302. However, the resilient coupling assembly 306 may take other forms such as a compression spring or a spring-loaded detent. The free ends of these springs or detents 308 may be weighted or manufactured in a manner that will allow a centrifugal force, generally directed radially outward as shown by arrow 319, to overcome or negate the spring force, generally directed radially inward as shown by directional arrow 321, acting upon the floater 302. This design allows for quiet clutch operation at low engine revolutions per minute (RPM) while improving high RPM gear changes.

Figure 6C:
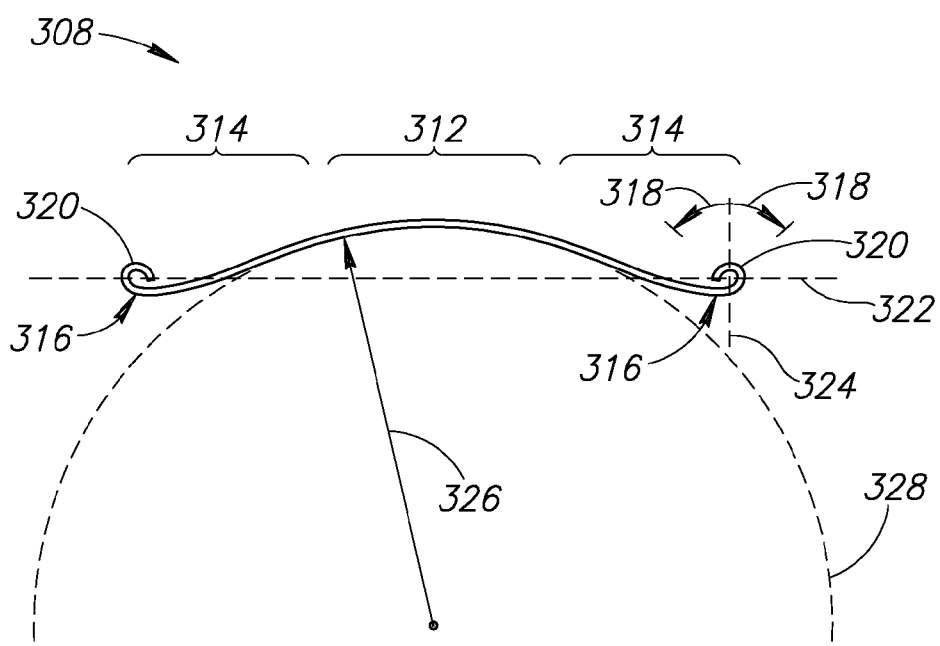
FIG. 6C is a top, plan view of a spring portion from one of the resilient coupling assemblies of FIG. 6A.

FIG. 6C shows the leaf spring 308 with a number of reference dimensions to generally indicate that the leaf spring 308 may be designed for a variety of situations to provide a stiffer or softer spring rate. By way of example, a shackle angle 318 that determines the angle of the eyes 320 relative to a datum line 322 may be varied to increase or decrease spring rate. A vertical line 324 indicates a ninety degree (90°) shackle angle. In addition, a radius 326 of the central arcuate portion 312 may be modified to change the spring rate of the leaf spring 308. In the illustrated embodiment, the radius defines a reference circle 328. However, it is appreciated that the central arcuate portion 312 may be non-circular, for example parabolic or have some other complex curvature.

Referring back to FIG. 6A, the friction clutch system 300 includes three resilient coupling assemblies 306, which corresponds to six contact locations because each assembly 306 includes two arms 314 (FIG. 6B). However, it is appreciated that a fewer or greater number of resilient coupling assemblies 306 may be employed depending on the size, loading, and other aspects of the friction clutch system 300. The resilient coupling assemblies 306 preferably in combination with gaps 330 permit the floater 302 to operate relative to the flywheel 304 while minimizing, if not eliminating, audible sounds that would ordinarily come from the floater 302 vibrating or "rattling" relative to the flywheel 304.

Figure 7:
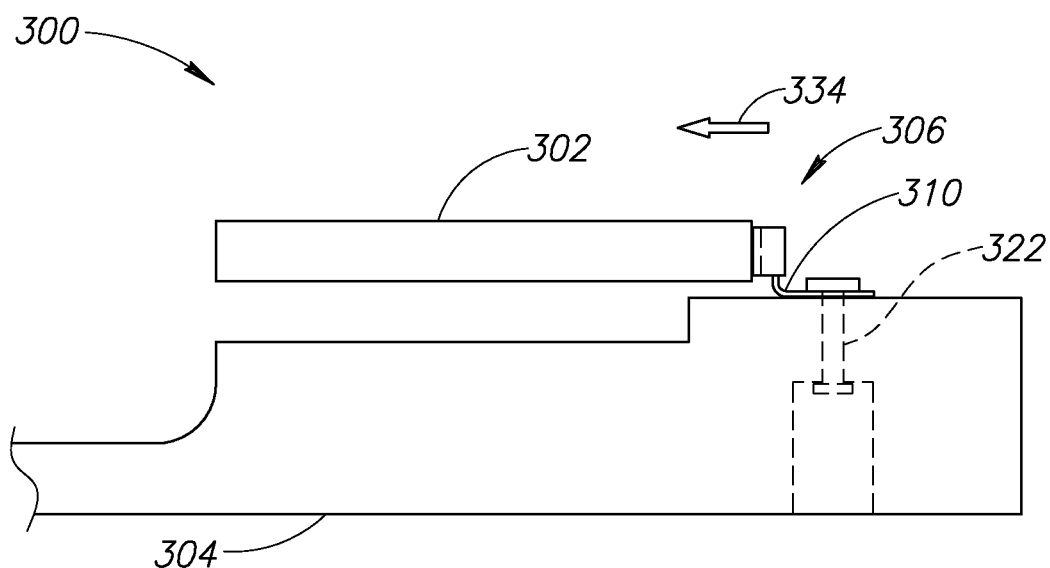
FIG. 7 is a schematic side view of the friction clutch system of FIG. 6A.

FIG. 7 schematically shows the floater 302 coupled to the flywheel 304 using the resilient coupling assembly 306. The clip 310 takes the form of a bent metal clip mechanically attached to the flywheel 304 with a fastener 322. The spring force of the clip 310 is generally directed as indicated by arrow 334.

Figure 8A:
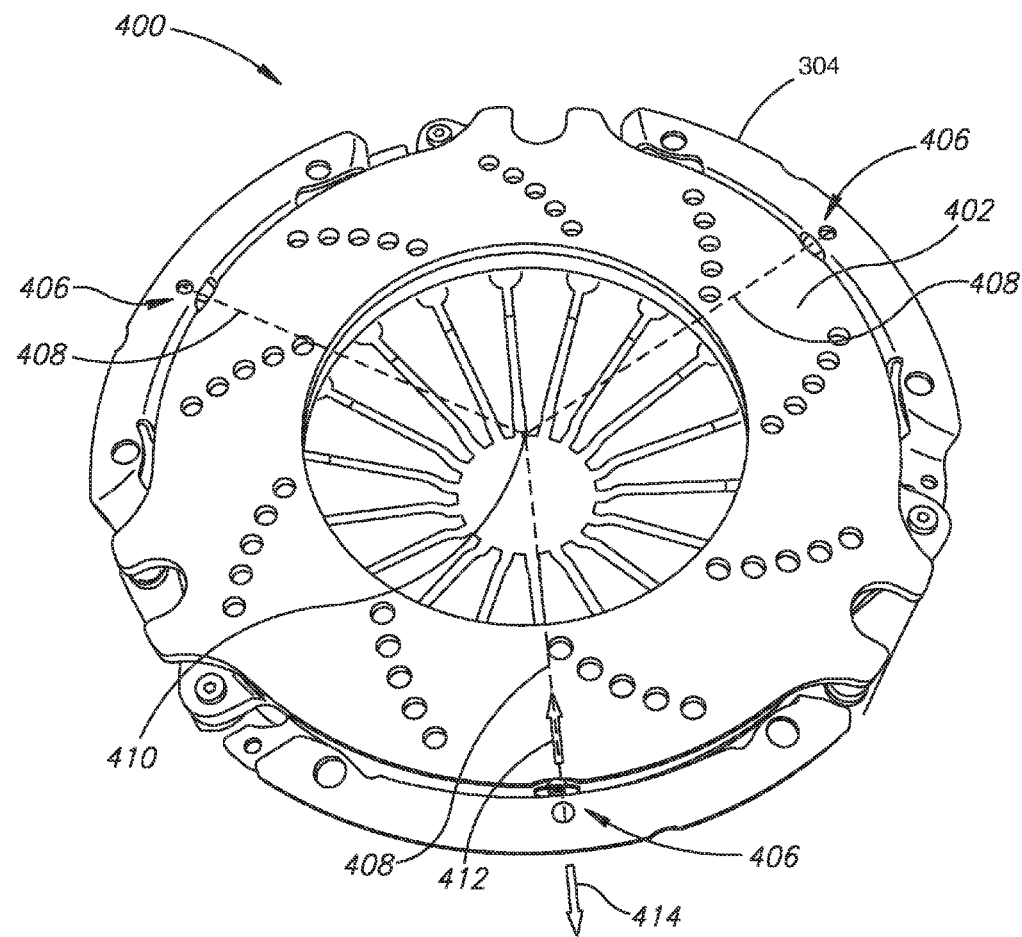
FIGS. 8A, 8C and 9 are perspective views of a friction clutch system having spring-loaded members mounted to the clutch pressure plate according to another embodiment of the present invention.
Figure 8B:
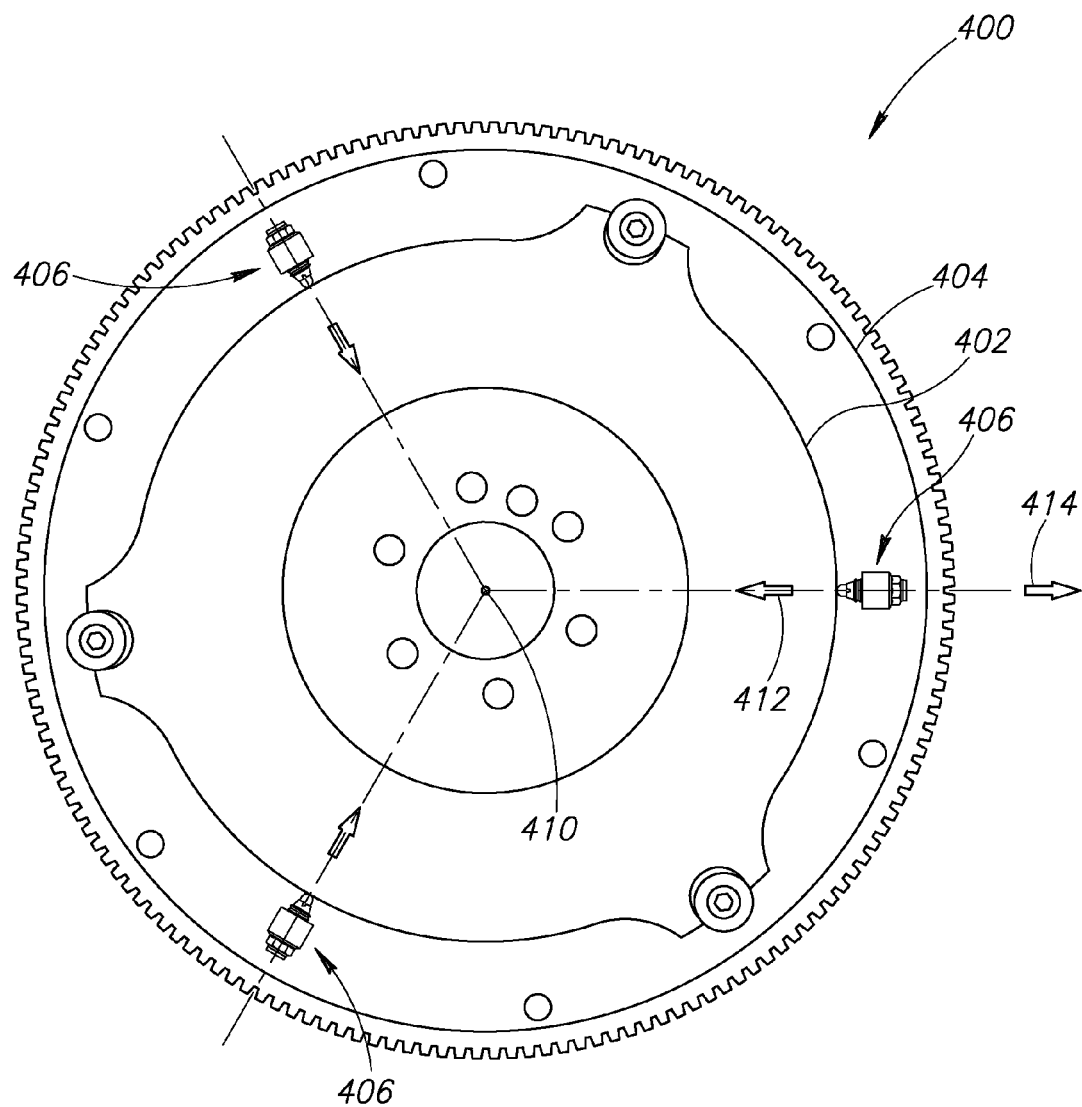
FIGS. 8B, 8D, 8E, 8F and 8G are perspective views of a friction clutch system having spring-loaded detent members mounted to the flywheel according to another embodiment of the present invention.
Figure 8C:
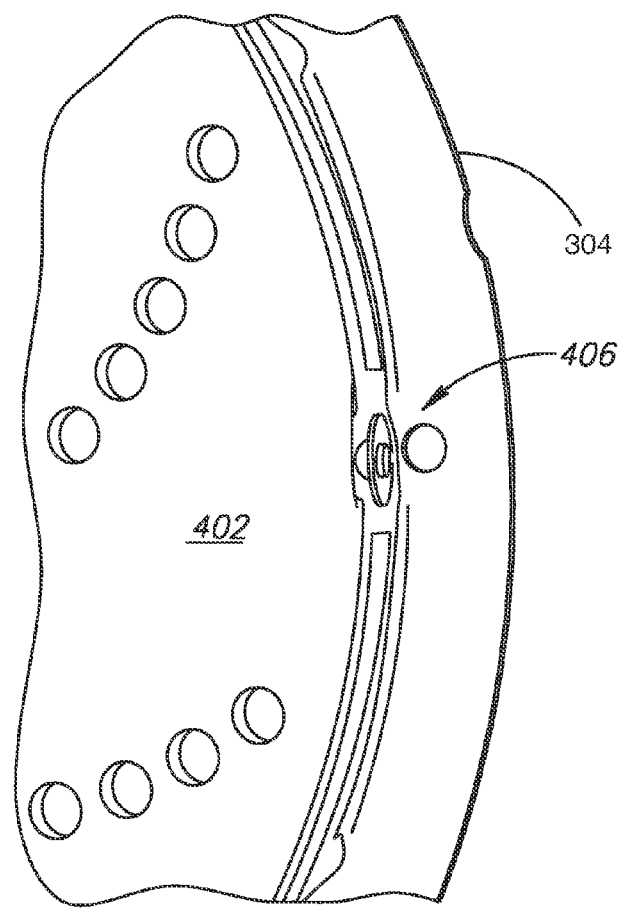
Figure 9:
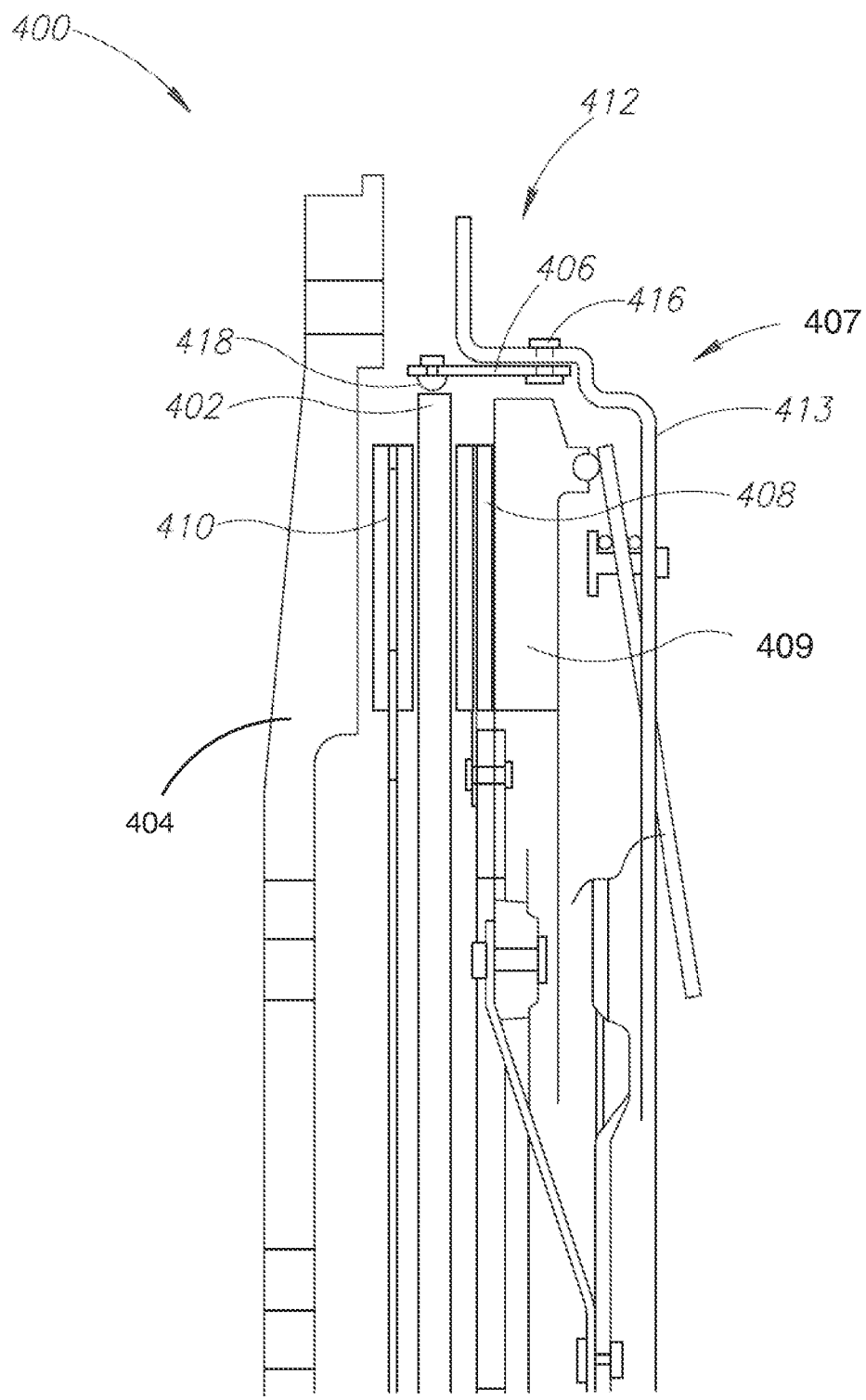

FIGS. 8A, 8C and 9 show another embodiment of a friction clutch system 400 having a floater 402 resiliently coupled to a pressure plate assembly 407 with a resilient coupling assembly 406. In the illustrated embodiment, the assembly 406 takes the form of a spring-loaded mechanism that is compression loaded between the floater 402 and the pressure plate assembly 407. The spring-loaded mechanism 406 is oriented along a radial line of action 408 extending from a central point 410 of the floater 402 or pressure plate 409 toward the spring-loaded mechanism 406. Alternatively stated, the spring-loaded mechanism 406 is attached to the pressure plate 409 and oriented to absorb kinetic energy from the floater 402 in a radial direction 408, and in which a spring force of the mechanism 406 is directed radially inward as indicated by arrow 412 to react a centrifugal force directed radially outward as indicated by arrow 414. In the illustrated embodiment, the assembly 406 takes the form of a semi-spherical member in contact engagement with a pin as best shown in FIG. 8C.

FIG. 8B and 8D-8F show the friction clutch system 400 with the flywheel 404 engaged with the floater 402 using a detent mechanism 406. In the illustrated embodiment, the detent mechanism 406 is adjustably received in a boss or lug 416 coupled to the flywheel 404. The mechanism 406 includes an externally threaded body 418 that permits adjustment relative to the boss 416 and an end cap 420 to secure the mechanism 406 once adequately adjusted.

Figure 8D:
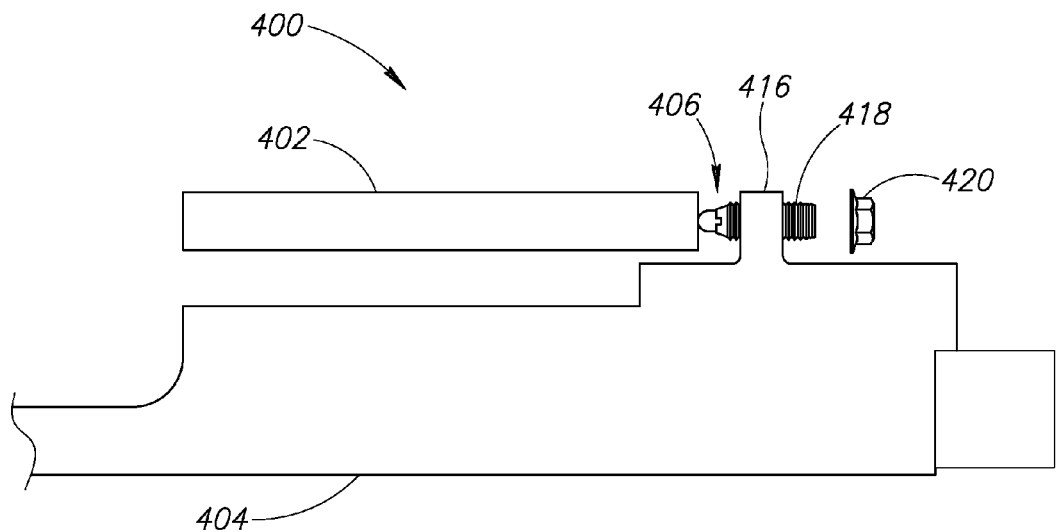
Figure 8E:
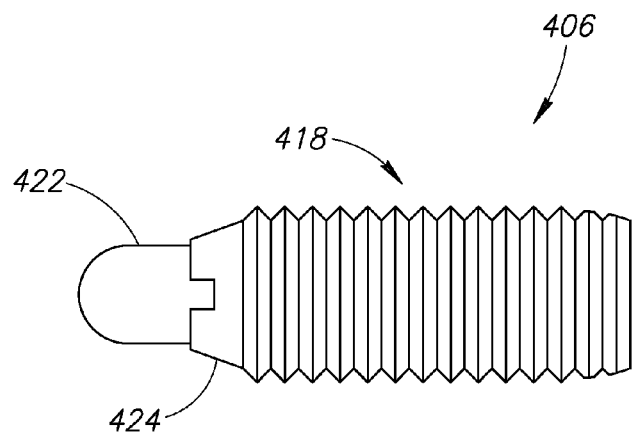
Figure 8F:
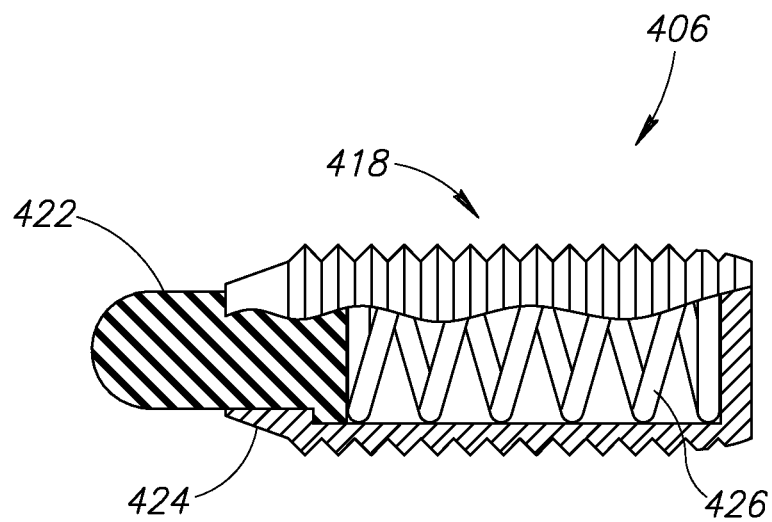
Figure 8G:
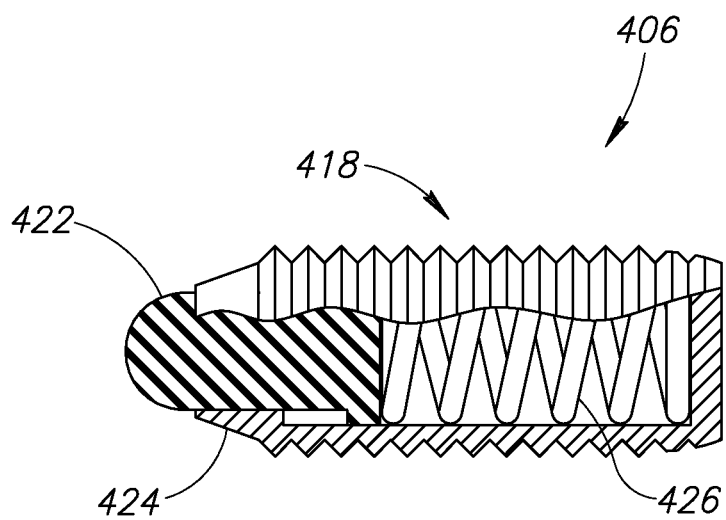

Referring specifically to FIGS. 8E-8G, the detent mechanism 406 includes the threaded body 418 coupled to a detent plunger 422. A collar 424 may be coupled to an end portion of the threaded body 418 to provide a tapered transition from the threaded body 418 to the detent plunger 422.

Referring specifically to FIGS. 8F and 8G, the mechanism 406 includes a biasing member 426 located within the threaded body 418. The biasing member 426 may take the form of a coil or compression spring having one end portion seated against a back wall of the threaded body 418 and an opposite end portion seated against the plunger 422. FIG. 8F shows the biasing member 426 in an extended position such that a tip of the plunger 422 has been moved away from the threaded body 418; whereas FIG. 8G shows the biasing member in a compressed position.

In the illustrated embodiments, the resilient coupling between the flywheel 404 and the floater 402 is achieved with a detent spring-loaded mechanism 406. FIGS. 8B and 8D best show the detent spring-loaded mechanism 406 is mounted to the flywheel 404 by threaded means within machined or otherwise permanently attached mounting lugs 416.

FIGS. 8E, 8F and 8G best shows the body of the detent spring-loaded mechanism 424 contains external threads 418 in which directly engage the internal threads (not shown) contained within the flywheel mounting lug 416 and allows for threaded lock nut 420 to prevent unintended movement of the detent mechanism 406 in relationship to the mounting lug 416. As best shown in FIGS. 8F and 8G the spring-loaded detent pin 422 is allowed liner movement within the mechanism body 424 by compressing detent spring 426.

FIG. 8F is a cut-a-way view that shows the detent spring 426 fully extended within the detent body 424. FIG. 8G is a cut-a-way view that shows the detent spring 426 partially compressed within the detent body 424. By means of the external body threads 418 (FIG. 8E) and internal threads (not shown) contained within the flywheel detent mounting lugs 416 allows for varying the amount of spring compression thus allowing easy spring force adjustment during manufacture and/or by the end user for individual application optimization. Referring back to FIG. 8B, the detent pins 422 (shown in FIGS. 8E, 8F and 8G) can be weighted or manufactured in a manner such that will allow centrifugal force, generally directed outward as shown by arrow 414, to overcome or negate the spring force as applied by detent spring 426 (shown in FIGS. 8F and 8G), force applied generally directed as shown by directional arrow 412 and acting directly upon the floater 402. This design also allows for quiet clutch operation at low engine revolutions per minute (RPM) while improving high RPM gear changes.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A friction clutch system comprising:
    a flywheel defining an axis of rotation and having a plurality of pins protruding therefrom;
    first and second pressure plates;
    a floater having a front face and a rear face and defining a plurality of pin receivers extending through the floater from the front face to the rear face, the front face interfacing with the first pressure plate and the rear face interfacing with the second pressure plate, each pin receiver having a pin of the plurality of pins slidingly positioned therein, the floater having a plurality of engagement surfaces each extending from the front face to the rear face, the plurality of engagement surfaces each being parallel to the axis of rotation from the front face to the rear face; and
    a plurality of coupling assemblies each secured to the flywheel and biased into engagement with one of the engagement surfaces of the plurality of surfaces of the floater; and
    wherein each coupling assembly includes a spring-loaded mechanism arranged to be in radially oriented contact with one of the engagement surfaces of the plurality of engagement surfaces of the floater.

2. The friction clutch system of claim 1, wherein the coupling assembly includes a leaf spring and a clip.

3. The friction clutch system of claim 2, wherein the leaf spring includes two arms extending from an arcuate central portion, the arms being in the radially oriented contact with the floater.

4. A method for coupling a floater to a flywheel, the method comprising:
    positioning the floater adjacent to the flywheel, wherein positioning the floater includes arranging the floater to have a radial gap relative to a protrusion extending from the flywheel;
    attaching a coupling assembly to the flywheel; and
    orienting the coupling assembly to absorb kinetic energy of the floater along at least one radial line extending from a center point of the floater, wherein absorption of the kinetic energy permits at least some radial displacement of the floater relative to the flywheel;
    wherein the coupling assembly includes
        a plurality of sleeves coupled to the flywheel and defining an opening facing inward toward the floater;
        a plurality of springs, each spring of the plurality of springs being positioned within a sleeve of the plurality of sleeves;
        a plurality of engagement members slidably engaging the sleeves and protruding out of the sleeves into engagement with the floater.

5. A friction clutch system comprising:
    a flywheel defining an axis of rotation and having a plurality of pins protruding therefrom;
    first and second pressure plates;
    a floater having a front face and a rear face and defining a plurality of pin receivers extending through the floater from the front face to the rear face, the front face interfacing with the first pressure plate and the rear face interfacing with the second pressure plate, each pin receiver having a pin of the plurality of pins slidingly positioned therein, the floater having a plurality of engagement surfaces each extending from the front face to the rear face, the plurality of engagement surfaces each being parallel to the axis of rotation from the front face to the rear face; and
    a plurality of coupling assemblies each secured to the flywheel and biased into engagement with one of the engagement surfaces of the plurality of surfaces of the floater, wherein the plurality of coupling assemblies each include:
        a sleeve coupled to the flywheel and defining an opening facing inward toward the floater;
        a plurality of springs, each spring of the plurality of springs being positioned within a sleeve of the plurality of sleeves;
        a plurality of engagement members slidably engaging the sleeves and protruding out of the sleeves into engagement with the floater.

6. The friction clutch system of claim 5, wherein the plurality of sleeves each have a threaded outer surface engaged with a boss secured to the flywheel.

* * * * *